Patented May 26, 1936

2,042,224

UNITED STATES PATENT OFFICE 2,042,224

PROCESS OF CONVERTING A POLYHYDRIC ALCOHOL TO A CARBONYL COMPOUND

Herbert P. A. Groll, Oakland, and George Hearne, Berkeley, Calif., assignors to Shell Development Company, San Francisco, Calif., a corporation of Delaware No Drawing. Application June 27, 1934, Serial No. 732,660

20 Claims. (Cl. 260—138)

This invention relates to a novel process for the treatment of polyhydric alcohols which comprises heating a polyhydric alcohol in the presence of a dilute solution or suspension of a suitable catalyst whereby valuable carbonylic compounds may be obtained, said carbonylic compounds being removed from the reaction mixture preferably substantially as soon as they are formed. More particularly we are concerned with the treatment of polyhydric alcohols containing at least three hydroxyl groups to the molecule such as glycerol and its homologues and suitable substitution products in dilute aqueous acid acting solutions at elevated temperatures whereby valuable, hitherto difficulty obtainable carbonylic compounds may be economically prepared.

It is well known that acrolein can be prepared by the thermic decomposition of anhydrous glycerol in the presence of certain strong dehydrating agents such as alkali-metal acid sulphates, phosphorus pentoxide and the like. The yields obtainable by the processes utilizing this principle do not in general exceed about 20% calculated on the glycerol consumed. Wohl (Berichte 45 page 2046) improved the state of the art by passing anhydrous glycerol in the vapor state over solid magnesium sulphate whereby yields of about 35% were attained. Numerous modifications of these basic processes are known but the yields of acrolein obtainable (28% to 50%), the relatively short period of activity and prohibitive cost of the dehydrating agent and the necessity of having the treated glycerol anhydrous and substantially pure are the principal factors that have not warranted the application of these processes to an economical technical scale production of this valuable compound.

The conversion of glycerol to acrolein has hitherto been considered as a dehydration reaction and consequently the use of strong dehydrating agents in the presence of substantially anhydrous glycerol was considered indispensable. The mechanism of the conventional dehydration reaction may be represented by the equations $CH_2OH-CHOH-CH_2OH \rightarrow$
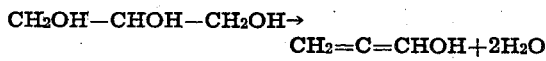
$CH_2=C=CHOH \rightarrow CH_2=CH-CHO$ We have discovered that excellent yields of acrolein may be obtained when glycerol is treated at elevated temperatures under the existing pressures with a strongly acid acting catalyst in dilute aqueous solution. In the light of our discovery, we base the principles of the present invention on the assumption that the primary reaction is a catalytic conversion of the glycerol to beta-hydroxy-propionaldehyde, which compound, being unstable under the conditions of its formation, splits off water to form acrolein. The mechanism of the reaction effected in the execution of our invention may be represented by the equations $CH_2OH-CHOH-CH_2OH \rightarrow$
$CH_2OH-CH_2-CHO+H_2O$
$CH_2OH-CH_2-CHO \rightarrow CH_2=CH-CHO+H_2O$ The theory of the mechanism of these reactions is supported by the fact that we may, in accordance with the principles of our invention, prepare unsaturated carbonylic compounds from glycerol and its homologues under conditions which preclude the occurrence of the conventional dehydration mechanism. Our invention is executed preferably with the polyhydric alcohol in solution or suspension with an excess of an aqueous and/or organic solvent solution or suspension of an acid acting rearrangement catalyst. Under the conditions of operation, it is evident that the polyhydric alcohol is not dehydrated in the presence of a substantial excess of water. The organic solvents which we may employ do not function as dehydrating agents but merely serve to render the operation more efficient since in many cases the polyhydric alcohols treated may be more soluble in said solvent than in an aqueous solution, and hence, the use of such solvents may enable us to conduct the reactions in a substantially homogeneous liquid system in the initial absence or presence of water. Our mechanism is further supported by the fact that the principles of our invention are in general applicable to the rearrangement of glycols to carbonylic compounds. It is known that some species of glycols may be converted to carbonylic compounds, but the conversion has not been considered as a dehydration but as catalytic rearrangement. The known methods of rearranging glycolic compounds have merited a very limited attention due to the fact that the disclosed operating conditions lead to excessive polymerization and condensation of the reaction product and accordingly very unsatisfactory yields are obtained. In accordance with the principles of the present invention, glycols may be converted to carbonylic compounds in excellent yields.

By our method acrolein is readily and easily prepared in high yields. Another advantage of our invention resides in the fact that we may employ crude glycerol containing varying amounts of water, salts and other impurities without resorting to the difficult and costly expedients of drying and purification necessitated by the known processes. For example, we may advantageously employ crude aqueous glycerol solutions such as are obtained as by-products in the manufacture of soap and related products.

The principles of our invention may be generally applied to the treatment of any polyhydric alcohol or substitution product thereof regardless of the relative positions of the carbinol groups in the molecule.

In the production of unsaturated carbonylic compounds, we prefer to execute our invention with those polyhydric alcohols possessing at least three carbinol groups to the molecule, said carbinol groups being vicinal to each other as in glycerol and its homologues. Another preferred group of alcohols includes those possessing at least one tertiary carbinol group which may be vicinal to or separated from at least two other vicinal carbinol groups by one or a series of tertiary carbon atoms. If the treated alcohol possesses only tertiary carbinol groups, the groups need not be vicinal but may be separated by one or a series of tertiary carbon atoms. In some cases when the polyhydric alcohol treated does not possess at least three vicinal carbinol groups, hydroxy-carbonylic instead of unsaturated carbonylic compounds may be obtained.

When the polyhydric alcohol treated is a glycol, that is, a compound possessing only two carbinol groups, the reaction product is generally a saturated carbonylic compound.

Suitable glycols may or may not possess the two carbinol groups vicinal to each other. We prefer, in the majority of cases, to execute our invention with those glycols wherein the carbinol groups are vicinal, or wherein a tertiary carbinol group is separated from another carbinol group by one or a series of tertiary carbon atoms.

In most cases, when the polyhydric alcohol treated possesses a primary carbinol group which is involved in the reaction, the reaction product is aldehydic. However, in certain cases in which a primary carbinol group is involved, ketones are formed through a mechanism which is not quite understood. The reaction product in these cases is a mixture of aldehyde and ketone, which mixture usually contains a larger amount of ketone than aldehyde. For example, an isoamylene glycol containing one primary carbinol group may be obtained by the hydration of a primary isopentenol (B. P. 139.5° C.), which in turn is produced by the hydrolysis of chlorisoamylene. This isoamylene glycol when treated in accordance with our invention, yielded a mixture consisting of 72.4% methyl isopropyl ketone and only 27.6% of the expected aldehyde.

When only secondary and/or tertiary carbinol groups are involved in the reaction, the product usually is ketonic in character. However, in certain cases, mixtures of aldehyde and ketones are formed. For example, we have found that the glycol of the formula

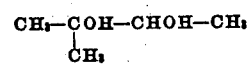

when treated in accordance with our invention, forms a mixture of about 90% methyl isopropyl ketone together with about 10% of an isovaleraldehyde of not yet identified structure formed by an unknown mechanism.

The polyhydric alcohols particularly adaptable to conversion in accordance with the present invention include among others those compounds containing at least three hydroxyl groups, which may be linked to vicinal carbon atoms or they may be linked to non-vicinal carbon atoms. We prefer to employ those alcohols possessing at least one primary or secondary carbinol group which will be involved in the reaction. Suitable polyhydric alcohols which may be converted to unsaturated carbonylic compounds include polyhydric alcohols such as

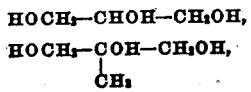
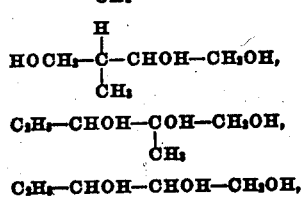
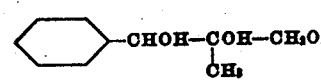

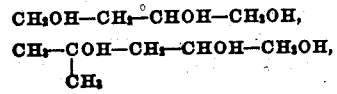
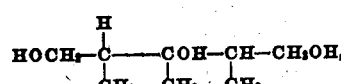
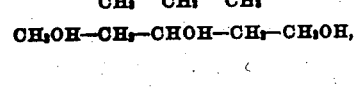
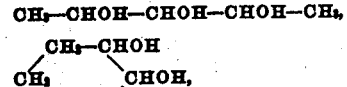

and the like and their homologues, analogues and substitution products.

Another preferred class of polyhydric alcohols includes glycols, polyglycols and suitable substitution products. Such compounds include among others

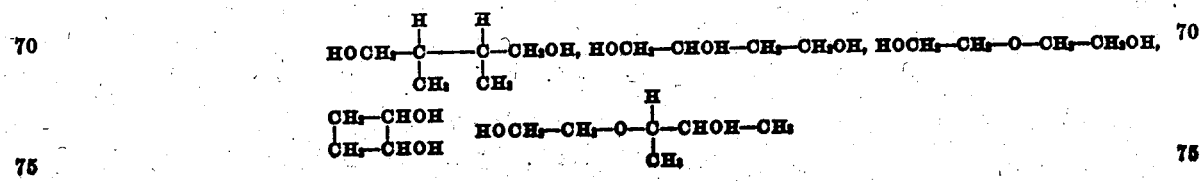

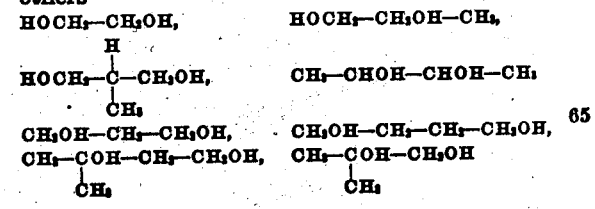

and the like and their homologues, analogues, and substitution products.

As catalysts for the conversion of polyhydric alcohols in accordance with the present invention we may use strong mineral acids such as $H_2SO_4$, $H_3PO_4$, $H_2S_2O_7$, $HPO_3$, HCl, HBr, $H_4P_2O_7$, $HClO_3$, $HClO_4$, $HNO_3$ and the like, or we may use compounds which will form strong mineral acids on contact with the reactant and/or solvent in the reaction mixture under the conditions of execution of the process. Such compounds include $SO_2Cl_2$, $SOCl_2$, $SO_2Br_2$, $NO_2$, $N_2O_3$, NOCl, $POCl_3$, $PCl_5$ and the like. We may also employ the acid salts of polybasic acids of strongly acidic character which contain at least one ionizable hydrogen such as $ZnH_2(SO_4)_2$, $NaHSO_4$, $NaH_2PO_4$ and the like. In some cases, particularly when compounds containing a tertiary carbinol group are treated, we may advantageously employ the acid reacting salts of strong mineral acids and weak bases such as $ZnSO_4$, $ZnCl_2$, $ZnBr_2$, $FeCl_3$, $FeBr_3$, $AlCl_3$, $CoCl_2$, $NiCl_2$, $Fe_2(SO_4)_3$, $Al_2(SO_4)_3$, etc. We may also employ as catalysts those organic compounds capable of acting as acid catalysts under the conditions of operation and in contact with the reaction mixture. Such compounds may include benzene sulphonic acid and its homologues and analogues, dialkyl and alkyl acid sulphates, alkylated phosphoric and sulphonic acids, halogenated organic acids, acids such as sulphoacetic, acid halides and compounds such as aniline hydrochloride.

The catalytic power of the catalyst employed is dependent on its acid strength and the temperature of execution of the process. The weaker the acidity of the catalyst, the lower is its catalytic power at any given temperature. Accordingly, other conditions being the same, the use of a weaker acid catalyst ordinarily requires its application in higher concentration or necessitates the use of higher operating temperatures in order to obtain the same degree of catalytic activity. In the majority of cases, we prefer to use sulphuric acid as the conversion catalyst. Sulphuric acid may be advantageously used in solutions having a concentration of from about 3% to 20%. The acid may be applied in higher concentration when acceleration of the reaction is desired, but ordinarily when sulphuric acid is used in concentrations exceeding about 20% there is a material decrease in yield of reaction product due to the formation of tar and other polymerization and condensation products.

Instead of aqueous solutions of the acid catalyst, we may employ the catalyst dissolved in a suitable organic solvent such as an organic acid. This modification of our process may be advantageously resorted to when a substantially homogeneous reaction mixture is desired, since some of the polyhydric alcohols treated are more soluble in the lower organic acids than in water. The most suitable organic solvents were found to be liquid organic acids, particularly those possessing a relatively low viscosity such as formic, acetic, propionic, butyric, isobutyric and the like.

It will be evident to those versed in the art, that our invention may be executed in a wide variety of ways. The only requirement of its successful operation is that the reaction product be removed from the acid reaction mixture substantially as soon as it is formed. The conversion of polyhydric alcohols to carbonylic compounds in the presence of an acid catalyst is accompanied by the occurrence of side reactions such as polymerization and condensation. In order to prevent the occurrence of these undesirable side reactions, we operate in such a manner that the contact of the formed carbonylic compound and the acid reaction mixture is substantially obviated. This is best achieved by effecting removal of the product substantially as soon as it is formed. Any suitable method of effecting this removal may be resorted to. In a preferred mode of operation, the dilute acid catalyst solution and selected polyhydric alcohol are admitted to a reaction vessel equipped with suitable means for agitating the reactants and wherein the reactants may be heated under superatmospheric pressures. It is desirable that the reaction product be distilled from the reaction mixture at about the same rate at which it is formed. A suitable distilling or fractionating apparatus is preferably arranged in communication with the reaction vessel in such a manner that the vapors or liquids from the latter may be conducted into a suitable portion of the distilling column. In the great majority of cases, the boiling temperature of the reaction product or its azeotropic mixture, which may comprise any of the other constituents of the reaction mixture as well as water initially added or formed during the reaction, is lower than the boiling temperature of the reaction mixture; hence by controlling the pressure on the system and the reflux ratio of the distilling column, we may remove the product at any desired rate.

When glycerol and its homologues are treated in aqueous acid solutions and readily polymerizable carbonylic compounds are obtained, we prefer to operate so that a substantial excess of water is distilled over with the reaction product. By resorting to this expedient, the product may be removed at a rate prohibitive to the occurrence of side reactions occasioned by prolonged contact with the acid reaction mixture.

The carbonylic compounds are readily recovered by condensing the vapors removed from the reaction vessel. The condensate which may comprise the carbonylic compound in mixture, solution or suspension with water, unreacted alcohol and/or other constituents of the reaction mixture may be utilized without resorting to separation of the constituents or the carbonylic compound may be separated by any suitable means such as stratification, extraction, distillation, use of drying agents, etc. The catalyst solvent and unreacted polyhydric alcohol may be returned to the reaction vessel for reutilization therein.

When the reaction product is a hydroxy-carbonylic compound, it usually cannot be recovered from the reaction mixture by distillation. In this case recovery of the reaction product may be effected by extraction or the product may be removed from the reaction mixture by reacting it with some suitable reactant, which may be in the reaction mixture, to form an insoluble resin or condensation product.

The order of introduction of the dilute catalyst solution and polyhydric alcohol to the reaction chamber may be varied to suit the taste of the operator. We prefer to operate with the catalyst solution in substantial excess over the polyhydric alcohol in the reaction vessel. In order to maintain the acid concentration and volume of the catalyst solvent substantially constant in the system, we may continuously or intermittently admit a quantity of solvent and catalyst to the reaction vessel equivalent in volume to that removed with the reaction product. When aqueous catalyst solutions are employed, we prefer to feed aqueous solutions of the polyhydric alcohols into the reaction vessel. The polyhydric alcohol and/or catalyst solvent may be introduced into any desired portion of the reaction vessel by any suitable means such as a porous disc, liquid injector, perforated tube, etc. Agitation of the reactants is useful since it materially enhances the rate of solution or dispersion of the introduced reactant and catalyst solvent.

Our invention is in the majority of cases executed in a preferred temperature range of from about 100° C. to 250° C., although higher temperature and correspondingly higher pressures may be employed when it is desired to accelerate the reaction. Ordinarily, we operate under superatmospheric pressures but in some cases atmospheric pressures may be advantageously employed.

We have observed that our invention is particularly applicable to treatment of polyhydric alcohols containing a tertiary carbinol group. Such compounds are converted to the corresponding carbonylic compounds with greater ease and in better yields than those alcohols containing only primary and/or secondary carbinol groups. In operating with members of this preferred class of polyhydric alcohols, lower temperatures and correspondingly lower pressures may be utilized, although, in the majority of cases, we prefer to use temperatures of about 100° C. and pressures slightly in excess of atmospheric. Better yields of carbonylic compounds are in general obtainable from these compounds due to the fact that the resulting reaction products are not as readily polymerized on contact with the acid reaction mixture under the less severe operating conditions which are to a lesser degree conducive to undesirable side reactions.

Our theory as to the greater activity of compounds possessing a tertiary carbinol group is supported by the discovery that beta-methyl glycerol is more readily and more completely converted to methyl acrolein than is the case with the conversion of glycerol to acrolein. This is in agreement with our observation that the two glycols, 1,2-propylene glycol and 1,2-isobutylene glycol, the latter is more readily and completely converted to its corresponding saturated carbonylic compound.

For the purpose of illustration only, reference will be had to several examples setting out modes of procedure when specific polyhydric alcohols are treated, although it is to be understood that we do not thereby limit our invention.

Example I 200 gm. (2.17 mols) of glycerol were dissolved in about 3 liters of water. This solution was fed, at a rate of about 500 c. c. per hour, into the kettle of a pressure still previously charged with about 2000 c. c. of an aqueous 8% H$_2$SO$_4$ solution. The kettle temperature was maintained at a temperature of about 190° C. An acrolein-water mixture was distilled from the reaction vessel at about the same rate at which the aqueous glycerol solution was admitted.

The condensed distillate was refractionated and 33.4 grams (0.6 mol.) of anhydrous acrolein were obtained from a total of 1.22 mols of glycerol reacted. The yield of acrolein was 49.2% of the theoretical.

Example II 100 gm. (0.944 mol.) of methyl glycerine (CH$_2$OH—COH—CH$_2$OH)
             |
             CH$_3$ were mixed with about 500 c.c. of an aqueous 12% H$_2$SO$_4$ solution. This mixture was placed in a pressure still and heated at about 120° C. The condensed distillate was dried and fractionated.

Methyl acrolein

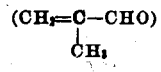

(CH$_2$=C—CHO)
       |
       CH$_3$ boiling at about 68° C. to 69° C. was obtained in a yield of about 70% of the theoretical.

Example III 125 gm. (1.39 mols.) of isobutylene glycol were mixed with 200 c. c. of 12% sulphuric acid and the mixture placed in the kettle of a distilling column. The mixture was heated to boiling and the distilling column adjusted so that the distillate is slowly removed under a heavy reflux.

The distillate was an azeotrope of isobutyraldehyde and water boiling at 64° C. to 65° C. under atmospheric pressure.

The conversion of isobutylene glycol to isobutyraldehyde was about 96%.

Example IV 180 gm. of isobutylene glycol and 500 gm. of an 8% aqueous sulphuric acid solution were charged into a suitable pressure still and the mixture heated to about 115° C. Distillate was withdrawn from the still at a rate of about 700 c. c. in one hour's time. The distillate was found to be a mixture consisting of about 50% isobutyraldehyde and about 50% water. Consequently in order to maintain the relative proportions of isobutylene glycol and acid solution in the system substantially constant, a mixture consisting of about 62.5% isobutylene glycol and about 37.5% water was charged to the kettle at such a rate that the volume of liquid in the system was kept substantially constant.

During five hours of continuous operation, a total of about 3600 c. c. of distillate was collected. The distillate was allowed to stratify and the two liquid layers were separated. The non-aqueous layer on fractionation yielded 1600 gm. of isobutyraldehyde. The product was obtained in a yield of 98% based on the isobutylene glycol reacted.

Example V 150 gm. of 2-methyl-butandiol-2,3 and about 200 c. c. of an aqueous 0.5 NHCl solution were mixed and charged to a pressure still. The mixture was heated at 105° C. and an azeotropic mixture of methyl isopropyl ketone and water was slowly withdrawn from the still head.

The total yield of carbonylic compounds was about 97%; methyl isopropyl ketone was obtained in a yield of 85% and valeraldehyde in a yield of about 12%.

Example VI 400 gm. (5.27 mols) of propylene glycol were mixed with 2000 c. c. of 12% H$_2$SO$_4$ and the mixture was placed in the kettle of a pressure still. The mixture was heated to a temperature of about 150° C. while the reaction product and water were distilled from the system at such a rate that the stillhead temperature was only about 5° C. below the kettle temperature. Water was introduced into the kettle from time to time to maintain the acid concentration at about 12%.

The condensed distillate was allowed to stratify. The non-aqueous layer was dried and fractionated, yielding 248 gm (4.27 mols) of a propionaldehyde-acetone mixture containing 95% propionaldehyde and 5% acetone. About 18 gm. of a higher boiling product was also obtained.

The residue in the kettle contained 18.3 gm. (0.24 mol.) of unchanged propylene glycol. The propionaldehyde-acetone mixture was therefore obtained in a yield of about 85% as calculated on the basis of the glycol consumed.

*Example VII*

50 gm. (0.66 mol.) of trimethylene glycol were mixed with about 500 c. c. of a 13% $H_2SO_4$ solution. This mixture was heated in a pressure still at a temperature of 175° C. The distillation was continued until the condensed distillate failed to show two liquid layers.

The condensed distillate was allowed to stratify and the non-aqueous layer was separated and fractionated. The fractionation yielded about 20 gm. of an aqueous mixture of aldehydes boiling in a temperature range of from 50° C. to 80° C. This mixture consisted of propionaldehyde and condensation products thereof such as methyl ethyl acrolein, as well as other by-products.

*Example VIII*

100 gm. (1.61 mols) of ethylene glycol were mixed with about 1000 c. c. of a 13% $H_2SO_4$ solution. This mixture was charged to the kettle of a pressure still and heated to 150° C. At this temperature practically no reaction took place. The kettle temperature was raised to about 175° C. An aqueous aldehyde mixture was distilled from the system at the latter kettle temperature.

The condensed distillate on fractionation yielded acetaldehyde boiling at about 20° C. and some higher boiling compounds such as crotonaldehyde and the like.

It will be evident that our invention may be executed in a batch, intermittent or continuous manner. The invention is not dependent, for its successful execution, on any specific apparatus or mode of operation. If desired, means other than distillation for removal of the reaction products substantially as soon as formed may be employed. For example, we may circulate a mixture of polyhydric alcohol and dilute acid solution through a heated tube. The still hot mixture containing the carbonylic reaction product may be passed from the heated tube directly into contact with some substance which serves to condense the carbonylic compound to a product insoluble in the reaction mixture. This reaction product may be separated from the reaction mixture, some more polyhydric alcohol added and the mixture again circulated through the heated tube.

The carbonylic compounds obtained in the execution of our invention may be used as resin-forming bodies per se or they may be converted to valuable resins and condensation products by utilization of any of the well known polymerization agents. Many of the products or mixtures thereof may be utilized for solvent and extraction purposes and as intermediates in the preparation of many useful organic chemicals. For example, they may be used to introduce alkyl or alkenyl groups into organic compounds by condensation or by the use of organo metallo derivatives. The unsaturated aldehydes and ketones may be oxidized to the corresponding acids and have varied uses in pharmaceutical chemistry.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories advanced as to the advantageous results attained. On the other hand, the invention is to be regarded as limited only by the terms of the accompanying claims, in which it is our intention to claim all novelty inherent therein as broadly as is possible in view of the prior art.

We claim as our invention:

1. A process for the production of valuable carbonylic compounds which comprises heating a polyhydric alcohol in the presence of a solution of mineral acid acting catalyst in a mutual solvent for the polyhydric alcohol and the catalyst which is substantially inert under conditions of operation, to a temperature at which conversion to a compound of the class consisting of aldehydes and ketones occurs at a practical rate, and removing the resulting carbonylic compound from the reaction mixture substantially as soon as it is formed therein while substantially avoiding oxidizing conditions of operations.

2. A process for the production of valuable carbonylic compounds which comprises heating a polyhydric alcohol containing a tertiary carbinol group in the presence of a solution of mineral acid catalyst in a mutual solvent for the polyhydric alcohol and the catalyst which is substantially inert under conditions of operation, to a temperature at which conversion to a compound of the class consisting of aldehydes and ketones occurs at a practical rate, and removing the resulting carbonylic compound from the reaction mixture substantially as soon as it is formed therein while substantially avoiding oxidizing conditions of operations.

3. A process for the production of valuable carbonylic compounds which comprises heating a polyhydric alcohol containing at least three carbinol groups in the presence of a solution of mineral acid acting catalysts in a mutual solvent for the polyhydric alcohol and the catalyst which is substantially inert under conditions of operation, to a temperature at which conversion to a compound of the class consisting of aldehydes and ketones occurs at a practical rate, and removing the resulting carbonylic compound from the reaction mixture substantially as soon as it is formed therein while substantially avoiding oxidizing conditions of operations.

4. A process for the production of valuable carbonylic compounds which comprises heating a dihydric alcohol in the presence of a solution of mineral acid acting catalyst in a mutual solvent for the polyhydric alcohol and the catalyst which is substantially inert under conditions of operation, to a temperature at which conversion to a compound of the class consisting of aldehydes and ketones occurs at a practical rate, and removing the resulting carbonylic compound from the reaction mixture substantially as soon as it is formed therein while substantially avoiding oxidizing conditions of operations.

5. A process for the production of valuable carbonylic compounds which comprises heating a polyhydric alcohol containing at least three vicinal carbinol groups in the presence of a solution of mineral acid catalyst in a mutual solvent for the polyhydric alcohol and the catalyst which is substantially inert under conditions of operation, to a temperature at which conversion to a compound of the class consisting of aldehydes and ketones occurs at a practical rate, and removing the resulting carbonylic compound from the reaction mixture substantially as soon as it is formed therein while substantially avoiding oxidizing conditions of operations.

6. A process for the production of valuable carbonylic compounds which comprises heating a polyhydric alcohol containing at least three carbinol groups linked to and separated from each other by tertiary carbon atoms in the presence of a solution of mineral acid acting catalyst in a mutual solvent for the polyhydric alcohol and the catalyst which is substantially inert under conditions of operation, to a temperature at which conversion to a compound of the class consisting of aldehydes and ketones occurs at a practical rate, and removing the resulting carbonylic compound from the reaction mixture substantially as soon as it is formed therein while substantially avoiding oxidizing conditions of operations.

7. A process for the production of valuable carbonylic compounds which comprises heating a polyhydric alcohol containing two vicinal carbinol groups in the presence of a solution of mineral acid acting catalyst in a mutual solvent for the polyhydric alcohol and the catalyst which is substantially inert under conditions of operation, to a temperature at which conversion to a compound of the class consisting of aldehydes and ketones occurs at a practical rate, and removing the resulting carbonylic compound from the reaction mixture substantially as soon as it is formed therein while substantially avoiding oxidizing conditions of operations.

8. A process for the production of valuable carbonylic compounds which comprises heating a polyhydric alcohol containing two carbinol groups separated from each other by at least one tertiary carbon atom in the presence of a solution of mineral acid acting catalyst in a mutual solvent for the polyhydric alcohol and the catalyst which is substantially inert under conditions of operation, to a temperature at which conversion to a compound of the class consisting of aldehydes and ketones occurs at a practical rate, and removing the resulting carbonylic compound from the reaction mixture substantially as soon as it is formed therein while substantially avoiding oxidizing conditions of operations.

9. A process for the production of valuable carbonylic compounds which comprises heating a polyhydric alcohol in the presence of a solution of a mineral acid catalyst in a mutual solvent for the polyhydric alcohol and the catalyst which is substantially inert under conditions of operation, to a temperature at which conversion to a compound of the class consisting of aldehydes and ketones occurs at a practical rate, and removing the resulting carbonylic compound from the reaction mixture substantially as soon as it is formed therein while substantially avoiding oxidizing conditions of operations.

10. A process for the production of valuable carbonylic compounds which comprises heating a polyhydric alcohol in the presence of a dilute aqueous solution of a mineral acid catalyst to a temperature at which conversion of the polyhydric alcohol to a compound of the class consisting of aldehydes and ketones occurs at a practical rate, and removing the resulting carbonylic compound from the reaction mixture substantially as soon as it is formed therein while substantially avoiding oxidizing conditions of operations.

11. A process for the production of valuable carbonylic compounds which comprises heating a polyhydric alcohol in the presence of an organic acid solution of a mineral acid catalyst to a temperature at which conversion of the polyhydric alcohol to a compound of the class consisting of aldehydes and ketones occurs at a practical rate, and removing the resulting carbonylic compound from the reaction mixture substantially as soon as it is formed therein while substantially avoiding oxidizing conditions of operations.

12. A process for the production of valuable carbonylic compounds which comprises heating a polyhydric alcohol in the presence of a dilute aqueous sulphuric acid solution to a temperature at which conversion to a compound of the class consisting of aldehydes and ketones occurs at a practical rate, and removing the resulting carbonylic compound from the reaction mixture substantially as soon as it is formed therein while substantially avoiding oxidizing conditions of operations.

13. A process for the production of valuable carbonylic compounds which comprises heating a polyhydric alcohol containing three vicinal carbinol groups with a solution of mineral acid acting catalyst at a temperature of from about 100° C. to about 250° C. and a pressure substantially greater than atmospheric and removing the resulting carbonylic compound from the reaction mixture substantially as soon as it is formed therein while substantially avoiding oxidizing conditions of operations.

14. A process for the production of valuable carbonylic compounds which comprises heating a polyhydric alcohol containing a tertiary carbinol group with a solution of a mineral acid catalyst to a temperature at which conversion of the polyhydric alcohol to a compound of the class consisting of aldehydes and ketones occurs at a practical rate, and removing the resulting carbonylic compound from the reaction mixture substantially as soon as it is formed therein while substantially avoiding oxidizing conditions of operations.

15. A process for the production of valuable carbonylic compounds which comprises heating a polyhydric alcohol containing a tertiary carbinol group in the presence of an aqueous solution of a salt of a strong mineral acid and a weak base and removing the resulting carbonylic compound from the reaction mixture substantially as soon as it is formed therein while substantially avoiding oxidizing conditions of operations.

16. A process for the production of valuable unsaturated carbonylic compounds which comprises heating a polyhydric alcohol containing three vicinal carbinol groups in the presence of a dilute aqueous solution of a mineral acid to a temperature and at a pressure at which conversion to an unsaturated compound of the class consisting of aldehydes and ketones occurs at a practical rate, and removing the resulting unsaturated carbonylic compound from the reaction mixture substantially as soon as it is formed therein while substantially avoiding oxidizing conditions of operations.

17. A process for the production of an acrolein which comprises heating a glycerol in the presence of an aqueous mineral acid solution and removing the acrolein from the acidic reaction mixture substantially as soon as it is formed therein while substantially avoiding oxidizing conditions of operations.

18. A process for the production of acrolein which comprises heating glycerol at a temperature of from 150° C. to 250° C. at a pressure substantially greater than atmospheric in the presence of a dilute aqueous sulfuric acid solution and distilling acrolein from the acidic reaction mixture substantially as soon as it is formed therein while substantially avoiding oxidizing conditions of operations.

19. A process for the production of saturated carbonylic compounds which comprises heating a glycol containing two vicinal carbinol groups in the presence of a dilute aqueous sulphuric acid solution and removing the resulting saturated carbonylic compound from the reaction mixture substantially as soon as it is formed therein while substantially avoiding oxidizing conditions of operations.

20. A process for the production of methyl acrolein which comprises heating methyl glycerol in the presence of an aqueous sulphuric acid solution at a temperature at which the methyl glycerol is converted to methyl acrolein at a practical rate and removing the methyl acrolein from the reaction mixture substantially as soon as it is formed therein while substantially avoiding oxidizing conditions of operations.

HERBERT P. A. GROLL.
GEORGE HEARNE.